United States Patent Office

2,817,682
Patented Dec. 24, 1957

2,817,682

CARBOXY-AMINO COMPOUNDS

Rudi F. W. Rätz, Columbus, Ohio, assignor to Olin Mathieson Chemical Corporation, a corporation of Virginia No Drawing. Application December 5, 1956
Serial No. 626,292

14 Claims. (Cl. 260—534)

My invention relates to new compositions of matter and methods for their preparation.

The novel compounds of my invention are compounds of the formula $$\text{HOOC}-\underset{\underset{N-NH_2}{\|}}{C}-\overset{H}{N}-R$$

wherein R is H or $NH_2$. More specifically, the compounds are carboxy-formamidrazone $$\text{HOOC}-\underset{\underset{N-NH_2}{\|}}{C}-NH_2$$

and carboxy-formhydrazidine $$\text{HOOC}-\underset{\underset{N-NH_2}{\|}}{C}-NH-NH_2$$

Also, as intermediates in the preparation of the above compounds the novel compounds hydrazinium thio-oxamate $$N_2H_4 \cdot \text{HOOC}-\underset{\underset{S}{\|}}{C}-NH_2$$

and the hydrazinium salt of carboxy-formamidrazone $$N_2H_4 \cdot \text{HOOC}-\underset{\underset{N-NH_2}{\|}}{C}-NH_2$$

are formed.

I have found that the above novel compounds can be prepared from free thio-oxamic acid by reaction with hydrazine. The free thio-oxamic acid is prepared according to my co-pending application Serial No. 626,293, filed December 5, 1956, by reacting an aqueous solution of an alkali metal, e. g. potassium, salt of thio-oxamic acid with a dilute mineral acid, e. g. hydrochloric acid, and immediately extracting the free acid from the aqueous reaction mixture with an organic water-immiscible solvent, e. g. diethyl ether.

Depending on the conditions different products are obtained from the reaction of thio-oxamic acid (I) and hydrazine. In alcoholic solution the acid reacts with one mole of hydrazine to form the hydrazinium thio-oxamate (II). The carboxy-formamidrazone (III) is obtained from hydrazinium thio-oxamate by simple treatment with water. With another mole of hydrazine in alcoholic solution the hydrazinium thio-oxamate yields the corresponding hydrazinium salt of carboxy-formamidrazone (IV). The latter salt (IV) on warming with water is converted into carboxy-formhydrazidine (V).

The new reactions are outlined in the following scheme:

$$\text{HOOC}-\underset{\underset{S}{\|}}{C}-NH_2 \quad (I)$$

$$\downarrow N_2H_4$$

$$N_2H_4 \cdot \text{HOOC}-\underset{\underset{S}{\|}}{C}-NH_2 \quad (II)$$

$$\downarrow \text{in } H_2O \quad | \quad +N_2H_4 \downarrow$$

$$\text{HOOC}-\underset{\underset{N-NH_2}{\|}}{C}-NH_2 \quad (III) \qquad N_2H_4 \cdot \text{HOOC}-\underset{\underset{N-NH_2}{\|}}{C}-NH_2 \quad (IV)$$

$$\downarrow \text{in } H_2O$$

$$\text{HOOC}-\underset{\underset{N-NH_2}{\|}}{C}-NH-NH_2 \quad (V)$$

In the reaction to produce the hydrazinium thio-oxamate (II) the temperature can be varied from about 0° to 30° C. When the carboxy-formamidrazone (III) is desired an excess of thio-oxamic acid is maintained at all times during the reaction since an excess of hydrazine results in the formation of hydrazinium salt of carboxy-formamidrazone (IV) rather than the desired carboxy-formamidrazone. In converting the hydrazinium thio-oxamate to the carboxy-formamidrazone by treatment with water a temperature of about 0° to 30° C. can be used. The quantity of water is not critical and can be varied widely.

In the reaction to produce the hydrazinium salt of carboxy-formamidrazone (IV) an excess of hydrazine is used and a temperature of about 0° to 30° C. can be used. In the formation of the carboxy-formhydrazidine (V) from the hydrazinium salt of carboxy-formamidrazone (IV) temperatures of from 0° to 100° C. can be used. Preferably, hot water is used. The quantity of water is not critical and can be varied widely.

The novel compounds are useful as intermediates. They are particularly useful in the preparation of simple aliphatic hydrazones. Carboxy-formhydrazidine and carboxy-formamidrazone are especially valuable for the synthesis of heterocyclic compounds. By heating them to 220° C. they are converted almost quantitatively into the valuable 4-amino-1,2,4-triazole. In a process set forth in Japanese Patent 2,661 (July 18, 1956) 4-amino-1,2,4-triazole is utilized in preparing highly viscous gelatin solutions used in the manufacture of photographic film. The compound 4-amino-1,2,4-triazole is also a valuable herbicide as shown by Jackson, W. D. and Polva, J. B. in Australian J. Science, 13, 149–150, 1951 (C. A. 45, 6699) and by Shaw, W. C. and Swanson, C. R. in Weeds, 2, 43, 1953 (C. A. 47, 11638). This same compound has been found useful for chemical defoliation and re-regrowth inhibition of cotton by Hall, W. C., Truchelut, G. B., and Lane, H. C. (Texas Agr. Expt. Sta. Bull. No. 759, 3–24; C. A. 47, 12735).

The carboxy-formamidrazone is also useful for the synthesis of new and valuable 1,2,4-triazines as described in co-pending application Serial No. 626,291, filed December 5, 1956, of Christoph J. Grundmann and Rudi Rätz. As described therein carboxy-formamidrazone can be reacted with an oxo-ester of the formula $$R'OOC-CO$$
$$R-\overset{|}{C}O,$$

wherein R is COOR' or H and wherein R' is an alkyl group of 1 to 18 carbon atoms, to form mono- and di-carbalkoxy-1,2,4-triazines.

The process of my invention will be further illustrated by reference to the following examples.

*Example 1*

Hydrazinium-thio-oxamate (II): 10.5 grams of thio-oxamic acid (0.1 mole) were dissolved in 100 milliliters of absolute ethanol and a solution of 3.20 grams of anhydrous hydrazine (0.1 mole) in 50 milliliters of absolute ethanol added dropwise with stirring and ice-cooling. The yellowish crystalline precipitate of hydrazinium thio-oxamate was filtered on a Buchner funnel, washed twice with 50 milliliters of absolute ethanol and dried over phosphorus-pentoxide. The yield was 9.83 grams.

*Example II*

Hydrazinium salt of carboxy-formamidrazone (IV): 10.5 grams of thio-oxamic acid (0.1 mole) were dissolved in 100 milliliters of absolute ethanol and a solution of 6.40 grams of anhydrous hydrazine (0.2 mole) in 50 milliliters of absolute ethanol added dropwise with stirring and cooling with ice. After two hours standing at room temperature the yellowish crystalline precipitate of the hydrazinium salt of carboxy-formamidrazone was filtered on a Buchner funnel, washed twice with 50 milliliters of ethanol and dried at room temperature over phosphorus pentoxide. The yield was 10.50 grams.

*Example III*

Carboxy-formamidrazone (III): 13.7 grams of hydrazinium-thio-oxamate (0.1 mole) were dissolved in about 40 milliliters of cold water. Immediately a violent evolution of hydrogen sulfide began. After one hour standing, ethanol was added until crystallization occurred. After standing overnight, the crystalline product was collected on a Buchner funnel. Recrystallization from 70 percent aqueous ethanol gave 8.95 grams of a fine, white, needle-like material, decomposing at 194°–196° C., and which was carboxy-formamidrazone. The yield was 87 percent. The product analysis was:

|  | C | H | N |
|---|---|---|---|
| Calcd. for $C_2H_5N_3O_2$ | 23.2 | 4.9 | 40.7 |
| Found | 23.42 | 5.21 | 40.44 |
|  | 23.36 | 5.29 | 40.53 |

*Example IV*

Carboxy-formhydrazine (V): 13.5 grams of the hydrazinium salt of carboxy-formamidrazone were dissolved in 100 milliliters of hot water. After cooling off to room temperature 11 grams of orange-yellow needle-like material, melting point 197° C. (under decomposition) were obtained. After several recrystallizations from water the melting point rose to 208°–209° C. The yield was 93 percent based on the hydrazinium salt. The carboxy-formhydrazidine product analysis was:

|  | C | H | N |
|---|---|---|---|
| Calcd. for $C_2H_6O_2N_4$ | 20.4 | 5.1 | 47.5 |
| Found | 20.70 | 5.12 | 47.59 |
|  | 20.66 | 5.09 | 47.57 |

In the preparation of carboxy-formamidrazone (III) from hydrazinium thio-oxamate (II) by treatment with water, hydrogen sulfide is also formed. In the preparation of the hydrazinium salt of carboxy-formamidrazone (IV) from thio-oxamic acid (I) and 2 moles of hydrazine, or from hydrazinium thio-oxamate (II) and 1 mole of hydrazine, hydrogen sulfide is also formed. In the preparation of carboxy-formhydrazidine (V) from the hydrazinium salt of carboxy-formamidrazone (IV) by treatment with warm water, ammonia is also formed.

I claim:

1. Compounds of the formula

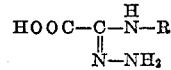

wherein R is selected from the group consisting of hydrogen and $NH_2$, and their hydrazinium salts.

2. Carboxy-formamidrazone.
3. The hydrazinium salt of carboxy-formamidrazone.
4. Carboxy-formhydrazidine.
5. As an intermediate in the preparation of the compounds of claim 1, hydrazinium thio-oxamate.
6. The process of preparing carboxy-formamidrazone and carboxy-formhydrazidine which comprises reacting thio-oxamic acid with sufficient hydrazine to form hydrazinium thio-oxamate, contacting a portion of the hydrazinium thio-oxamate with water to form carboxy-formamidrazone, reacting a portion of the hydrazinium thio-oxamate with sufficient hydrazine to produce the hydrazinium salt of carboxy-formamidrazone and contacting the said hydrazinium salt with warm water to form carboxy-formhydrazidine.
7. The process of preparing hydrazinium thio-oxamate which comprises reacting thio-oxamic acid with sufficient hydrazine to form hydrazinium thio-oxamate.
8. The process of claim 7 in which the temperature of reaction is about 0 to 30° C.
9. The process of preparing carboxy-formamidrazone which comprises contacting hydrazinium thio-oxamate with water.
10. The process of claim 9 in which the temperature of contacting is about 0 to 30° C.
11. The process of preparing the hydrazinium salt of carboxy-formamidrazone which comprises reacting thio-oxamic acid with sufficient hydrazine to form the hydrazinium salt of carboxy-formamidrazone.
12. The process of claim 11 in which the temperature of reaction is about 0 to 30° C.
13. The process of preparing carboxy-formhydrazidine which comprises contacting the hydrazinium salt of carboxy-formamidrazone with warm water.
14. The process of claim 13 in which the temperature of contacting is about 0 to 100° C.

No references cited.